United States Patent [19]

Sugiyama

[11] Patent Number: 5,068,785
[45] Date of Patent: Nov. 26, 1991

[54] BUS CONTROL FOR SMALL COMPUTER SYSTEM INTERFACE WITH TRANSFER INDICATION PRECEDING FINAL WORD TRANSFER AND BUFFER EMPTY INDICATION PRECEDING RECEIPT ACKNOWLEDGEMENT

[75] Inventor: Yukinori Sugiyama, Tokyo, Japan

[73] Assignee: NEC Corporation, Tokyo, Japan

[21] Appl. No.: 367,635

[22] Filed: Jun. 19, 1989

[30] Foreign Application Priority Data

Jun. 17, 1988 [JP] Japan .................................. 63-149703

[51] Int. Cl.[5] ............................................. G06F 13/42
[52] U.S. Cl. .................................. 395/325; 364/240.9;
364/239.6; 364/DIG. 1
[58] Field of Search ... 364/200 MS File, 900 MS File

[56] References Cited

U.S. PATENT DOCUMENTS

| | | | |
|---|---|---|---|
| 4,195,340 | 3/1980 | Joyce | 364/200 |
| 4,435,762 | 3/1984 | Milligan et al. | 364/200 |

Primary Examiner—Lawrence E. Anderson
Attorney, Agent, or Firm—Foley & Lardner

[57] ABSTRACT

A bus control system includes a handshake control circuit connected to receive an information transfer request signal from a data bus and to generate an information receipt acknowledge signal. The handshake control circuit operates to control a handshake between the information transfer request signal and the information receipt acknowledge signal. A first in-first out type memory is coupled to the data bus and is controlled by the handshake control circuit so as to receive information from the data bus and to output information to the data bus. In addition, the memory outputs an empty signal when the memory is empty, and the empty signal is supplied to the handshake control circuit. A counter is provided to be preset with an information transfer number and coupled to receive the information receipt acknowledge signal generated by the handshake control circuit so as to count the number of the information transfers executed and to generate a transfer completion ready signal when the information transfers of the number less than the preset number of the information transfer by one have been executed. Furthermore, an information receipt acknowledge hold control circuit is coupled to receive the transfer completion ready signal. The information receipt acknowledge hold control circuit operates to control the handshake control circuit, after the transfer completion ready signal is activated, so as to cause the handshake control circuit to hold the information receipt acknowledge signal in an active condition after the information receipt acknowledge signal in correspondence to a last information transfer is activated and until the empty signal is activated to indicate the emptiness of the memory.

9 Claims, 8 Drawing Sheets

BUS CONTROL FOR SMALL COMPUTER SYSTEM INTERFACE WITH TRANSFER INDICATION PRECEDING FINAL WORD TRANSFER AND BUFFER EMPTY INDICATION PRECEDING RECEIPT ACKNOWLEDGEMENT

BACKGROUND OF THE INVENTION

1. Field of the Invention

The present invention relates to a bus control for a small computer system interface (called "SCSI" hereinafter) which is one interface for peripheral instruments of a small computer, and more specifically to a SCSI bus control in the case that a first in-first out memory (called "FIFO" hereinafter) is used for transmitting information to an SCSI bus and receiving information from the SCSI bus.

2. Description of Related Art

Figure 1:
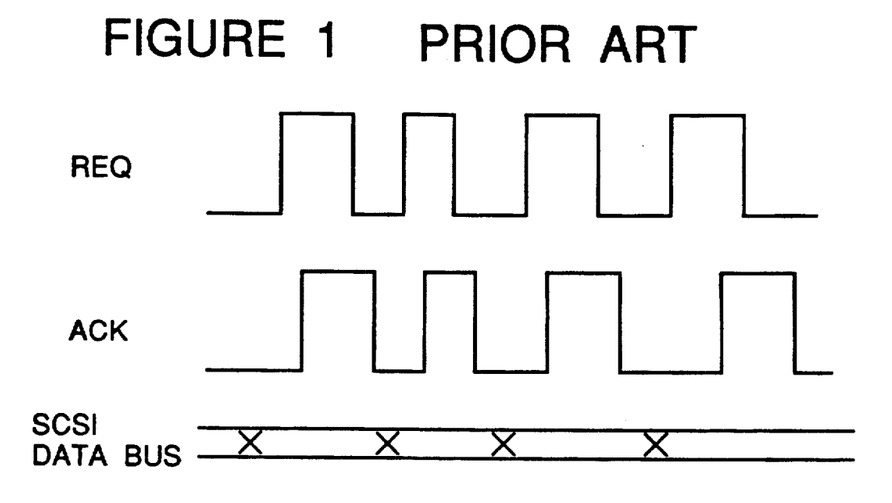
FIG. 1 is a timing chart illustrating one typical example of the asynchronism transfer in the SCSI.
Figure 2:
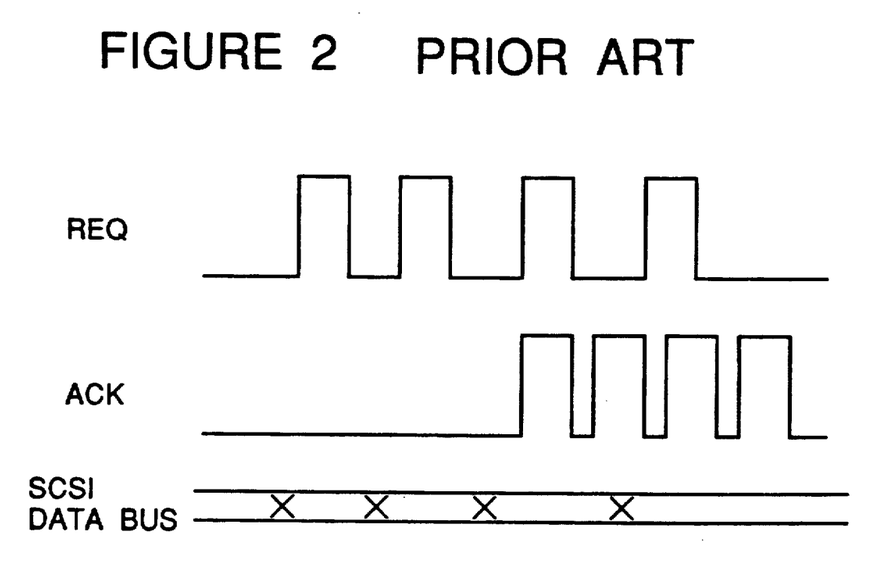
FIG. 2 is a timing chart illustrating a typical example of the synchronism transfer in the SCSI.

A conventional information transfer in the SCSI can be divided into an asynchronism transfer in which the information is transferred by a perfect handshake between a transfer request signal (called "REQ signal" hereinafter) driven by a target and a transfer acknowledge signal (called "ACK signal" hereinafter) driven by an initiator, and a synchronism transfer in which a REQ signal can be sent without confirming the receipt of the ACK signal. One typical example of the asynchronism transfer is illustrated in FIG. 1, and a typical example of the synchronism transfer is illustrated in FIG. 2. In these figures, the mark "x" in the SCSI data bus indicates data being transferred.

In the conventional SCSI bus control system, when an initiator receives information, the initiator will inactivate the ACK signal for a last information transmission, without checking an empty of the FIFO used for receiving information from an SCSI bus (and also used for transmitting information to the SCSI bus). Thereafter, when a reading of information from the FIFO is completed and the FIFO becomes empty, a transfer system is then initialized. On the other hand, when the initiator has inactivated the ACK signal for the last information transmission, the target which transmits information to the initiator confirms the completion of the transfer phase, and then, can go into a next phase.

Therefore, if the transfer of information from a target to an initiator provided with FIFO is controlled in the conventional SCSI bus control system, there is possibility that the target changes its phase when information still remains in the FIFO. In this situation, if a phase transferring information from the target to the initiator in a synchronism transfer mode is started, the initiator is forced to receive the transmitted information, though the information sent in the preceding phase still remains in the FIFO. As a result, when the information sent in the preceding phase has been read or cleared from the FIFO, the information sent in the next phase already exists in the FIFO, and therefore, the transfer system can no longer initiate the transfer system.

SUMMARY OF THE INVENTION

Accordingly, it is an object of the present invention to provide a SCSI bus control which has overcome the above mentioned defect of the conventional one.

Another object of the present invention is to provide a SCSI bus control which can applied to an initiator having a FIFO and which permits a target to change its phase after the FIFO has become empty.

The above and other objects of the present invention are achieved in accordance with the present invention by a bus control system including a handshake control circuit connected to receive an information transfer request signal from a data bus and to generate an information receipt acknowledge signal, the handshake control circuit operating to control a handshake between the information transfer request signal and the information receipt acknowledge signal, a first in-first out type memory coupled to the data bus and controlled by the handshake control circuit so as to receive information from the data bus and to output information to the data bus, the memory outputting an empty signal when the memory is empty, the empty signal being supplied to the handshake control circuit, a counter configured to be preset with an information transfer number and coupled to receive the information receipt acknowledge signal generated by the handshake control circuit so as to count the number of the information transfers executed and to generate a transfer completion ready signal when the information transfers of the number less than the preset number of the information transfers by one have been executed, and an information receipt acknowledge hold control circuit coupled to receive the transfer completion ready signal, the information receipt acknowledge hold control circuit operating to control the handshake control circuit, after the transfer completion ready signal is activated, so as to cause the handshake control circuit to hold the information receipt acknowledge signal in an active condition after the information receipt acknowledge signal in correspondence to a last information transfer is activated and until the empty signal is activated to indicate the empty of the memory.

According to another aspect of the present invention, there is provided a bus control system including a handshake control circuit connected to receive an information transfer request signal from a data bus and to generate an original information receipt acknowledge signal, the handshake control circuit operating to control a handshake between the information transfer request signal and the information receipt acknowledge signal, a first in-first out type memory coupled to the data bus and controlled by the handshake control circuit so as to receive information from the data bus and to output information to the data bus, the memory outputting an empty signal when the memory is empty, a counter configured to be preset with an information transfer number and coupled to receive the original information receipt acknowledge signal generated by the handshake control circuit so as to count the number of the information transfers executed and to generate a transfer completion ready signal when the information transfers of the number less than the preset number of the information transfers by one have been executed, and an information receipt acknowledge hold control circuit coupled to receive the transfer completion ready signal and the empty signal, and to receive the original information receipt acknowledge signal from the handshake control circuit to output an information receipt acknowledge signal to the data bus, the information receipt acknowledge hold control circuit operating to output the original information receipt acknowledge signal to the data bus as the information receipt acknowledge signal before the transfer completion ready signal is activated, the information receipt acknowledge hold control circuit also operating, after the transfer completion ready signal is activated, to maintain the information receipt acknowledge signal in an active condition after the original information receipt acknowledge signal in correspondence to a last information transfer is activated and until the empty signal is activated to indicate the empty of the memory.

According to a third aspect of the present invention, there is provided a bus control system including a handshake control circuit connected to receive an information transfer request signal from a data bus and to generate an original information receipt acknowledge signal, the handshake control circuit operating to control a handshake between the information transfer request signal and the original information receipt acknowledge signal, a first in-first out type memory coupled to a data bus and controlled by the handshake control circuit so as at least to receive information from the data bus, the memory outputting an empty signal when the memory is empty, a counter configured to be preset with a information transfer number and coupled to receive the original information receipt acknowledge signal generated by the handshake control circuit so as to count the number of the information transfers executed, the counter operating to generate a transfer completion ready signal when the information transfers of the number less than the preset number of the information transfers by one have been executed, and a transfer completion signal when the information transfers of the preset number have been executed, a processor connected to receive the empty signal and the transfer completion signal and operating to generate an operation start signal to the handshake control signal, the processor also operating to generate an activated initiator receipt mode signal when the system should operate to receive information as an initiator and to inactivate the initiator receipt mode signal when the transfer completion signal is activated and the empty signal is activated, and an information receipt acknowledge hold control circuit coupled to receive the transfer completion ready signal and the initiator receipt mode signal, and also coupled to receive the original information receipt acknowledge signal from the handshake control circuit to output an information receipt acknowledge signal to the data bus, the information receipt acknowledge hold control circuit operating to output the original information receipt acknowledge signal to the data bus as the information receipt acknowledge signal before the transfer completion ready signal is activated, the information receipt acknowledge hold control circuit also operating, after the transfer completion ready signal is activated, to maintain the information receipt acknowledge signal in an active condition after the original information receipt acknowledge signal in correspondence to a last information transfer is activated and until the initiator receipt mode signal is inactivated.

The above and other objects, features and advantages of the present invention will be apparent from the following description of preferred embodiments of the invention with reference to the accompanying drawings.

DESCRIPTION OF THE PREFERRED EMBODIMENTS

Figure 3:
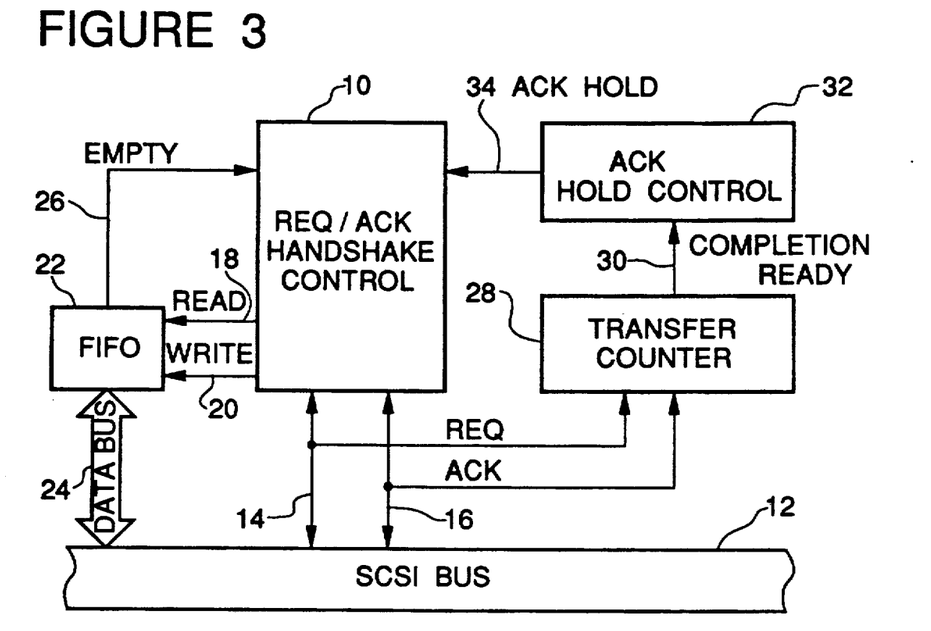
FIG. 3 is a block diagram of a first embodiment of the SCSI bus control system in accordance with the present invention.

Referring to FIG. 3, there is shown a block diagram of a first embodiment of the SCSI bus control system in accordance with the present invention.

The shown SCSI bus control system includes a REQ/ACK handshake control circuit 10 coupled to a SCSI bus 12 through a REQ signal line 14 and an ACK signal line 16, in order to control a handshake between a REQ signal and an ACK signal. This control circuit 10 generates a read signal 18 and a write signal 20 to a FIFO 22, which is in turn coupled through a data bus 24 to the SCSI bus 12. The FIFO 22 generates an empty signal 26 to the control circuit 10. In addition, the REQ signal line 14 and the ACK signal line 16 are coupled to a counter 28, which is adapted to be set with the transfer time number and to generate a transfer completion ready signal 30 indicative of the fact that there have been completed the information transfers of the number less than the set transfer time number by one. This signal 30 is supplied to an ACK hold control circuit 32, which generates an ACK hold signal 34 to the REQ/ACK handshake control circuit 10 in order to cause to inhibit an inactivation of the ACK signal for a last information transfer, when the shown system operates as an initiator and receives information from a target.

Now, operation of the above mentioned system will be explained.

If an information transfer phase is started, the REQ/ACK handshake control circuit 10 controls a handshake operation of the REQ signal and the ACK signal on the SCSI bus 12, and also controls operations of reading from the FIFO 22 and writing to the FIFO 22. The FIFO 22 operates to output information through the data bus 24 to the SCSI bus 12 in response to the read signal 18 from the REQ/ACK handshake control circuit 10, and to fetch information through the data bus 24 from the SCSI bus 12 in response to the write signal 20. In addition, if no information exists in the FIFO 22, the FIFO 22 activates the empty signal 26.

The counter 28 operates to count the REQ signal pulse or the ACK signal pulse on the SCSI bus 12 so as to calculate the number of the transfers executed, and further to activate the transfer completion ready signal 30 when the current transfer time number becomes less than the set transfer time number by one. In addition, when the system operates to receive information as the initiator, if the transfer completion ready signal 30 is activated, the ACK hold control circuit 32 activates the ACK hold signal 34. In response to the activated ACK hold signal 34, the REQ/ACK handshake control circuit 10 firstly activates the ACK signal for a next transfer information, namely, a last transfer information, and to maintain the ACK signal for the last transfer information in an activated condition unless the empty signal 26 is activated, or for a time period in which the empty signal 26 is in an inactivated condition. For a period of this holding of the activated ACK signal, the information fetched from the SCSI bus 12 to the FIFO 22 is read from the FIFO 22, with the result that the FIFO 22 becomes empty and activates the empty signal 26. In response to the activated empty signal 26, the REQ/ACK handshake control circuit 10 operates to inactivate the ACK signal for the last transfer information. Namely, the current information transfer phase will not be terminated while the ACK signal for the last transfer information is maintained in the activated condition. Accordingly, the target cannot go into a next phase.

As seen from the above explanation, in the first embodiment, until the FIFO of the initiator is brought into an empty condition in the phase of transmitting information from the target to the initiator, the transition of the phase in the target will not be performed. Therefore, the problem of the prior art SCSI bus control system can be overcome.

Figure 4:
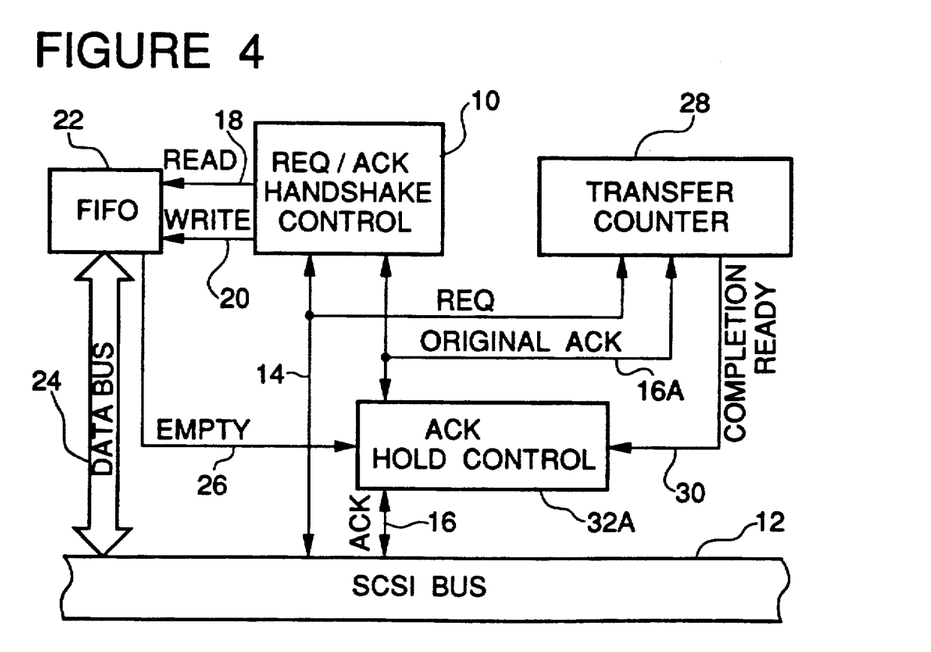
FIG. 4 is a diagram similar to FIG. 3 but showing a second embodiment of the SCSI bus control system in accordance with the present invention.

Referring to FIG. 4, there is shown a second embodiment of the SCSI bus control system in accordance with the present invention. In FIG. 4, elements similar to those shown in FIG. 3 are given the same Reference Numerals, and explanation thereof will be omitted.

As seen from comparison between FIGS. 3 and 4, an ACK hold control circuit 32A of the second embodiment does not generate the ACK hold signal, but is located between the REQ/ACK handshake control circuit 10 and the SCSI bus 12 so that the ACK hold control circuit 32A operates to receive the original ACK signal 16A from the REQ/ACK handshake control circuit 10 and transmit the ACK signal 16 to the SCSI bus 12 and also to receive the ACK signal 16 from the SCSI bus 12 and to transmit an original ACK signal 16A to the REQ/ACK handshake control circuit 10 and the counter 28. In addition, the empty signal 28 generated by the FIFO 22 is supplied to the ACK hold control circuit 32A, not to the REQ/ACK handshake control circuit 10.

The second embodiment of the SCSI bus control system operates as follows. However, only operation differing from the first embodiment will be explained.

When the shown system performs any operation other than a receiving operation as the initiator, or when the transfer completion ready signal 30 is inactive, the ACK hold control circuit 32A operates to output the original ACK signal 16A from the REQ/ACK handshake control circuit 10 to the SCSI bus 12 as the ACK signal 16 without modification.

When the shown system performs a receiving operation as the initiator, if the information transfers of the number smaller than the set transfer time number by one have been completed, the transfer completion ready signal 30 is activated, similarly to the first embodiment. After transfer completion ready signal 30 is activated, when the REQ/ACK handshake control circuit 10 activates the original ACK signal 16A for a next transfer information (namely, a last transfer information), the ACK hold control circuit 32A also activates the ACK signal 16 for the last transfer information. However, the ACK hold control circuit 32A operates to maintain the ACK signal 16 for the last transfer information in an activated condition unless the empty signal 26 is activated, or for a time period in which the empty signal 26 is in an inactivated condition, even if the REQ/ACK handshake control circuit 10 inactivates the ACK signal 16 for the last transfer information.

For a period of this holding of the activated ACK signal, the information fetched from the SCSI bus 12 to the FIFO 22 is read from the FIFO 22, with the result that the FIFO 22 becomes empty and activates the empty signal 26. In response to the activated empty signal 26, the ACK hold control circuit 32A operates to inactivate the ACK signal 16 for the last transfer information. Namely, similarly to the first embodiment, the current information transfer phase will not be terminated while the ACK signal for the last transfer information is maintained in the activated condition. Accordingly, the target cannot go into a next phase.

Figure 5:
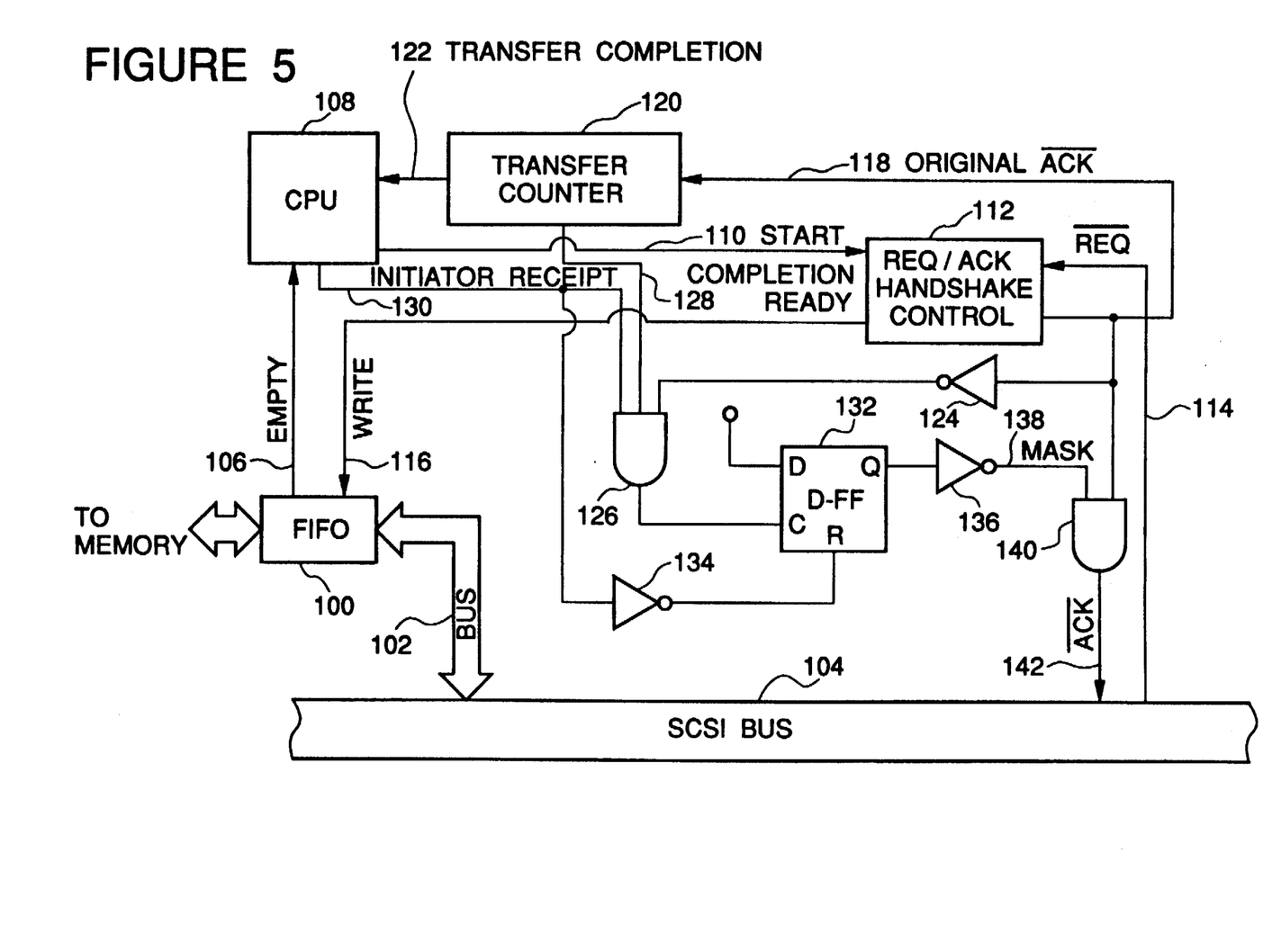
FIG. 5 is a diagram similar to FIG. 3 but showing a third embodiment of the SCSI bus control system in accordance with the present invention.

Referring to FIG. 5, there is shown a block diagram of a third embodiment of the SCSI bus control system in accordance with the present invention. In FIG. 5 and in the following description, the indication of the construction including signal lines and the explanation of the operation will be limited to those required when the shown system operates to receive information as an initiator.

The shown system includes a FIFO 100 coupled through a bus 102 to a SCSI bus 104 and also coupled to a memory (not shown) of a small computer. The FIFO 100 is configured to generate an empty signal 106 when the FIFO 100 is an empty. The empty signal 106 is inputted to a central processing unit (CPU) 108. The CPU 108 is adapted to generate a start signal 110 to an REQ/ACK handshake control circuit 112. This REQ/ACK handshake control circuit 112 controls a handshake between a REQ signal from the SCSI bus 104 and an ACK signal to the SCSI bus 104 in an information transfer operation. The REQ/ACK handshake control circuit 112 is connected to receive from the SCSI bus 104 a $\overline{REQ}$ signal 114 indicative of an information transfer request. The REQ/ACK handshake control circuit 112 outputs a data write signal 116 to the FIFO 100, and generates an original $\overline{ACK}$ signal 118 indicative of receipt acknowledgement of a transferred information. The $\overline{REQ}$ signal 114 and the original $\overline{ACK}$ signal 118 are active at low level in the shown embodiment. This original $\overline{ACK}$ signal 118 is inputted to a counter 120, which is in turn adapted to count the transfer time number so as to generate a transfer completion signal 122 when the information transfers of the set transfer time number have been completed. This transfer completion signal 122 is inputted to the CPU 108.

Furthermore, the original $\overline{ACK}$ signal 118 is supplied through an inverter 124 to a first input of a three-input AND gate 126, which has a second input connected to receive from the counter 120 a transfer completion ready signal 128 indicative of the fact that there have been completed the information transfers of the number less than the set transfer time number by one. A third input of the AND gate 126 is connected to receive from the CPU 108 a signal 130 indicative of the fact that the shown system receives information as an initiator. An output of the AND gate 126 is connected to a clock input "C" of a D-type flipflop 132. This flipflop 132 has a reset input "R" connected to receive through an inverter 134 the initiator receipt signal 130 from the CPU 108. A data input "D" of the flipflop 132 is connected to a fixed potential (not shown), and a Q output of the flipflop 132 is connected to an inverter 136 which generates a mask signal 138. This mask signal 138 is supplied to one input of a two-input AND gate 140, which has a second input connected to the original $\overline{ACK}$ signal 118. This AND gate 142 outputs the original $\overline{ACK}$ signal 118 to the SCSI bus 104 as an $\overline{ACK}$ signal 142 when the mask signal 138 is at a high level.

Now, operation of the third embodiment shown in FIG. 5 will be explained.

When the shown system operates to receive information as an initiator, the CPU 108 activates the signal 130, and set the transfer time number to the counter 120. Furthermore, the CPU 108 also activates the start signal 110 supplied to the REQ/ACK handshake control circuit 112. In response to the activated start signal 110, the REQ/ACK handshake control circuit 112 starts the handshake operation of the original $\overline{ACK}$ signal 118 in reply to the $\overline{REQ}$ signal 114 on the SCSI bus 104. Furthermore, the REQ/ACK handshake control circuit 112 outputs the write signal 116 to the FIFO 100 at each time in which the $\overline{REQ}$ signal is activated. Since the flipflop 132 has been reset by the initiator receipt signal 130 when a preceding information transfer phase was completed, the mask signal 138 of the inverter 136 is maintained at a high level in an ordinary receiving condition, so that the AND gates 140 is opened to allow the original $\overline{ACK}$ signal 118 to be outputted as it is to the SCSI bus 104 as the $\overline{ACK}$ signal 142.

At each time in which the write signal is activated, the information on the SCSI bus 104 is fetched through the bus 102 to the FIFO 100. As explained hereinbefore, the counter 120 operates to count the original $\overline{ACK}$ signal 118, and activates the transfer completion ready signal 128 when the information transfers of the number less than the set transfer time number by one have been completed, and the transfer completion signal 122 when the information transfers of the set transfer time number have been completed.

As the result of a progress of the information transfer operation, when the information transfers of the number less than the set transfer time number by one have been completed, the transfer completion ready signal 128 is activated. Thereafter, the REQ/ACK handshake control circuit 112 activates the original $\overline{ACK}$ signal 118 corresponding to a last transferred information, for example a last transfer byte. Namely, the original $\overline{ACK}$ signal 118 is brought to a low level, and the output of the inverter 124 is brought to a high level. As a result, the output of the AND gate 126 is brought into a high level, since the transfer completion ready signal 128 has been already brought to a high level and the initiator receipt signal 130 is at a high level. Accordingly, the D-type flipflop 132 is set to generate a high level Q output. Namely, the mask signal 138 of the inverter 136 is brought into an active condition, i.e., to a low level. Thereafter, the $\overline{REQ}$ signal 114 is inactivated (namely brought to a high level), and correspondingly, the original $\overline{ACK}$ signal is also inactivated (namely brought to a high level) by the REQ/ACK handshake control circuit 112. Nevertheless, since the mask signal 138 is active (at a low level), the $\overline{ACK}$ signal 142 outputted to the SCSI bus 104 is maintained active (at a low level). Accordingly, the information transfer phase is not terminated.

On the other hand, since the counter 120 counts the original $\overline{ACK}$ signal 118, the counter 120 reaches the count number corresponding to the set transfer time number, during a period in which the $\overline{ACK}$ signal 142 is maintained in the activated condition. As a result, the transfer completion signal 122 is activated by the counter 120.

In response to the activated transfer completion signal 122, the CPU 108 checks the empty signal 106 from the FIFO 100. If the FIFO 100 is already empty, the CPU 108 immediately inactivates the initiator receipt signal 130. If the FIFO 100 is not empty, the CPU 108 inactivates the initiator receipt signal 130 immediately after the FIFO 108 becomes empty.

In response to the inactivated initiator receipt signal 130, the D-type flipflop 132 is reset, so that the mask signal 138 is brought to a high level, i.e., into an inactive condition. Therefore, the $\overline{ACK}$ signal 142 is also inactivated, so that the information transfer phase is now completed.

In this third embodiment, and in the phase of transferring information from a target to the initiator, the phase of the target will not be changed until the FIFO of the initiator becomes empty. Accordingly, the problem of the prior art can be overcome.

Figure 6:
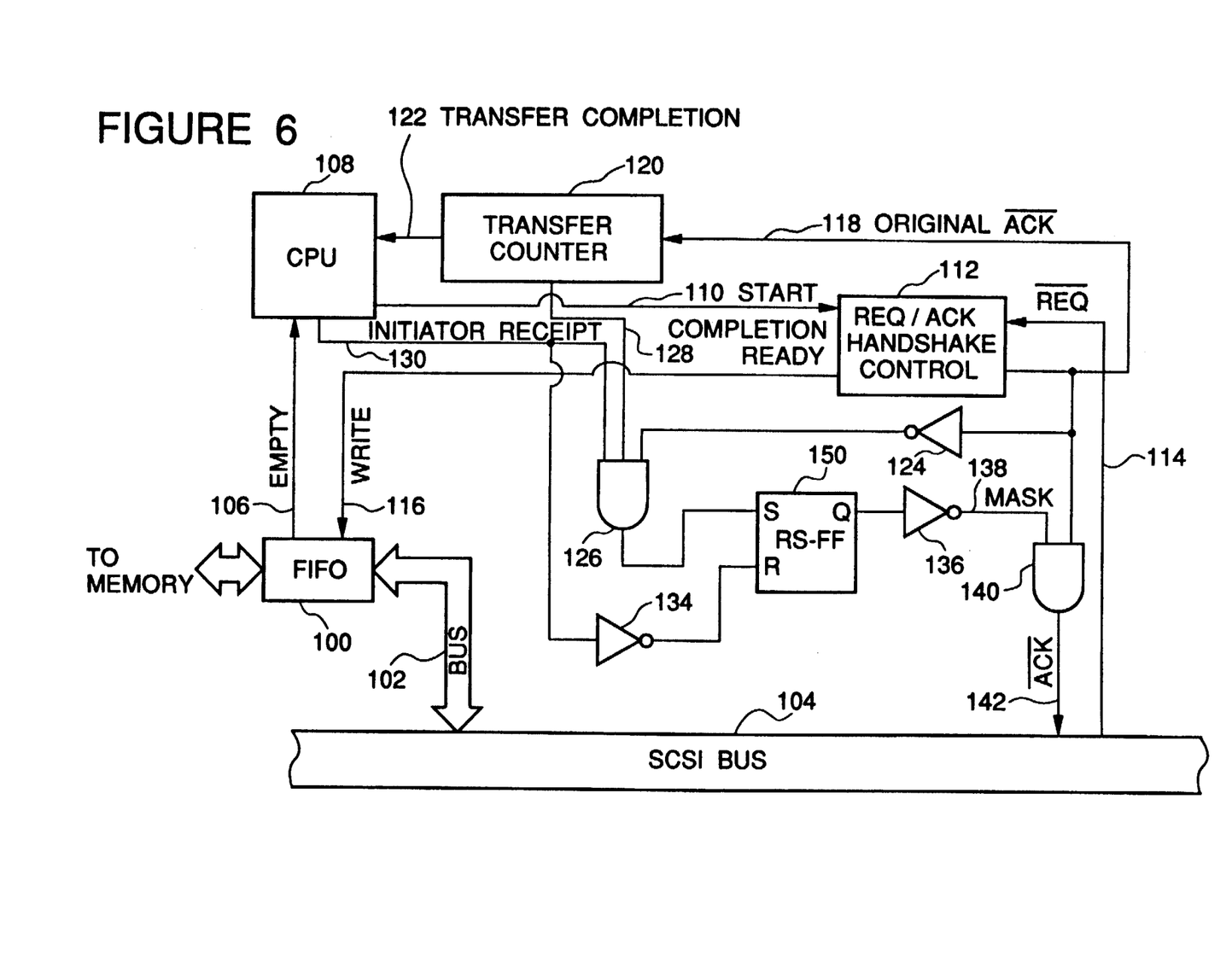
FIG. 6 is a diagram similar to FIG. 3 but showing a fourth embodiment of the SCSI bus control system in accordance with the present invention.

Referring to FIG. 6, there is shown a block diagram of a fourth embodiment of the SCSI bus control system in accordance with the present invention. In FIG. 6, elements similar to those shown in FIG. 5 are given the same Reference Numerals, and explanation thereof will be omitted.

As seen from comparison between FIGS. 5 and 6, the fourth embodiment shown in FIG. 6 includes a RS flipflop (reset-set flipflop) 150 in place of the D-type flipflop 132 of the third embodiment shown in FIG. 5. The RS flipflop 150 has a set input "S" connected to the output of the AND gate 126 and a reset input "R" connected to the output of the inverter 134. In other points, the third and fourth embodiments are identical to each other. In the following, therefore, description of the operation of the fourth embodiment shown in FIG. 6 will be limited to those of the portion different from the third embodiment shown in FIG. 5.

When the output of the AND gate 126 is activated, namely, is brought into a high level, the active signal is inputted to the set input "S" of the RS flipflop 150. At this time, on the other hand, since the initiator receipt signal 130 is active without exception, the reset input "R" of the RS flipflop 150 is inactive.

Furthermore, when the initiator receipt signal 130 is inactivated, the active signal or a high level signal is inputted to the reset input "R" of the flipflop 150. At this time, the set input "S" of the RS flipflop 150 is made inactive without exception, since the initiator receipt signal 130 is inactivated.

Therefore, even if the D-type flipflop 132 shown in FIG. 5 is replaced with the RS flipflop 150, the SCSI bus control system can operate similarly to the third embodiment, and therefore, the problem of the prior art can be overcome.

Figure 7:
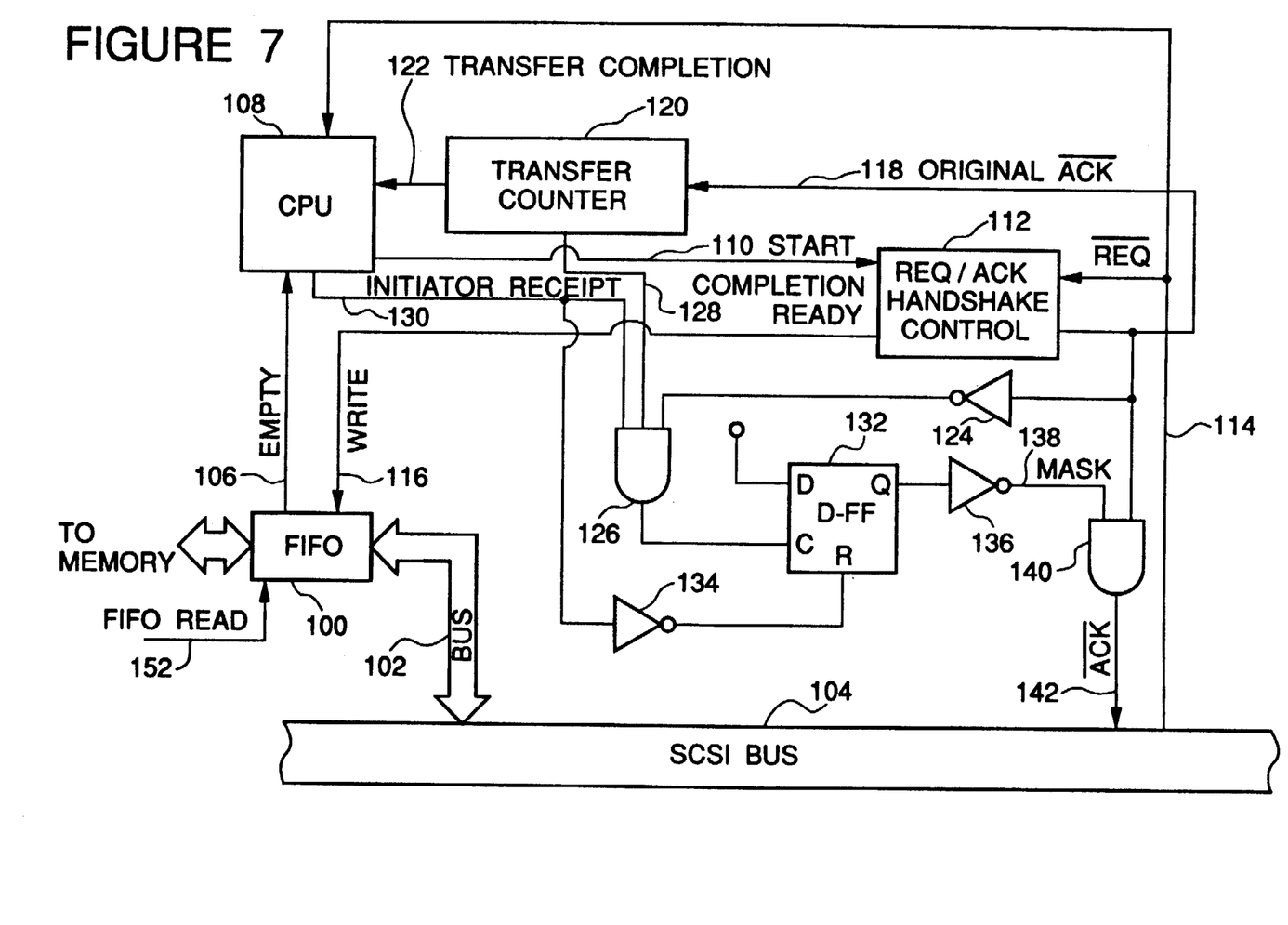
FIG. 7 is a diagram similar to FIG. 3 but showing a fifth embodiment of the SCSI bus control system in accordance with the present invention.

Referring to FIG. 7, there is shown a block diagram of a fifth embodiment of the SCSI bus control system in accordance with the present invention. In FIG. 7, elements similar to those shown in FIG. 5 are given the same Reference Numerals, and explanation thereof will be omitted.

As seen from comparison between FIGS. 5 and 7, the fifth embodiment is such that the $\overline{REQ}$ signal 114 is supplied not only to the REQ/ACK handshake control circuit 112 but also to the CPU 108, and a FIFO read signal 152 is inputted to the FIFO 100 from a controller such as a DMA (direct memory access) controller (not shown).

Now, operation of the fifth embodiment shown in FIG. 7 will be explained with reference to FIGS. 9 and 10. FIG. 9 is a timing chart illustrating one asynchronism information transfer operation example of the SCSI bus control system shown in FIG. 7, and FIG. 10 is a timing chart illustrating one synchronism information transfer operation example of the SCSI bus control system shown in FIG. 8.

Figure 9:
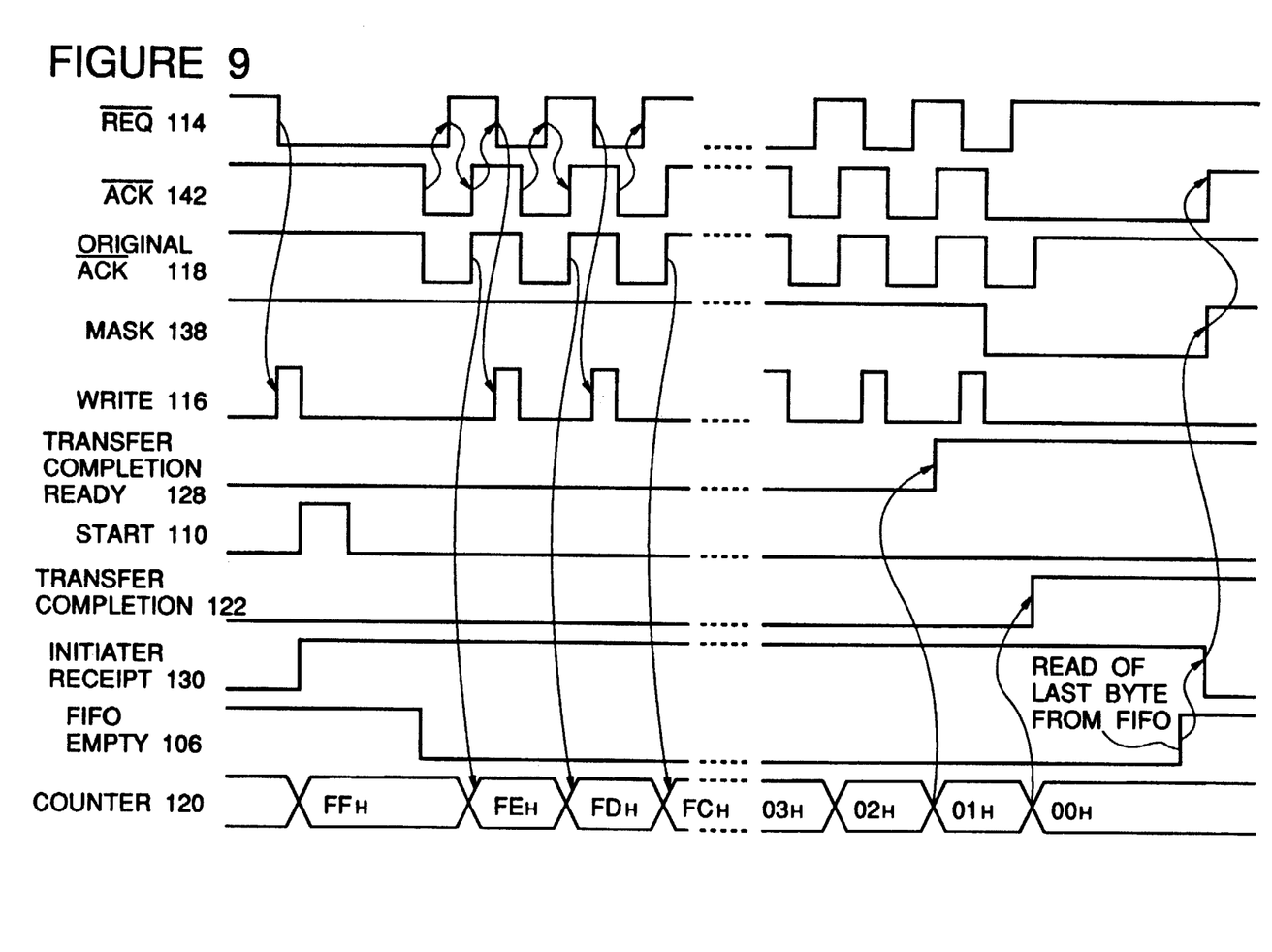
FIG. 9 is a timing chart illustrating an asynchronism information transfer operation example of the SCSI bus control system shown in FIG. 7.
Figure 10:
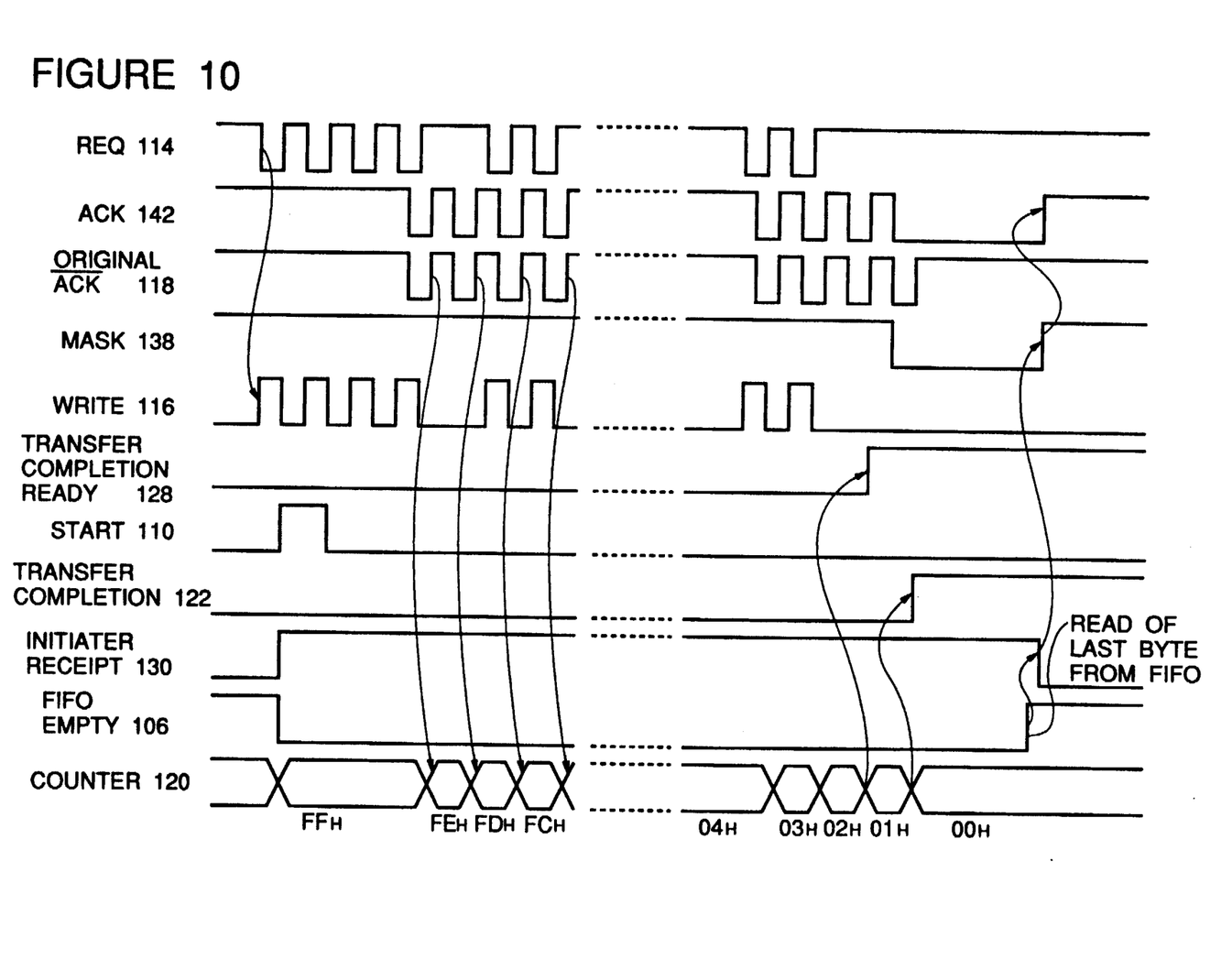
FIG. 10 is a timing chart illustrating a synchronism information transfer operation example of the SCSI bus control system shown in FIG. 8.

If the $\overline{REQ}$ signal 114 on the SCSI bus 104 is activated namely falls down as shown in FIGS. 9 and 10, the CPU 108 detects the activated $\overline{REQ}$ signal 114, namely a falling edge of the $\overline{REQ}$ signal 114, and judges that the shown system operates to receive information as an initiator. As a result, the CPU 108 activates the signals 110 and 130. Namely, the start signal 110 in the form of a positive going pulse is inputted to the REQ/ACK handshake control circuit 122, and the initiator receipt signal 130 is brought to a high level. Furthermore, the CPU 108 sets the transfer time number to the counter 120. In the example shown in FIGS. 9 and 10, the transfer number "FF$_H$" is set to the counter 120, and the counter 120 is decremented at each time the original $\overline{ACK}$ signal 118 is activated. Here, the suffix "H" indicates the hexadecimal notation in this specification. In response to the activated start signal 110, the REQ/ACK handshake control circuit 112 starts the handshake operation of the original $\overline{ACK}$ signal 118 in reply to the $\overline{REQ}$ signal 114 on the SCSI bus 104.

On the other hand, the REQ/ACK handshake control circuit 112 outputs the write signal 116 in the form of a positive pulse to the FIFO 100 at each time in which the $\overline{REQ}$ signal 114 is activated, namely in response to each falling edge of the $\overline{REQ}$ signal 114. Since the flipflop 132 has been reset by the initiator receipt signal 130 when a preceding information transfer phase was completed, the mask signal 138 of the inverter 136 is maintained at a high level in an ordinary receiving condition, so that the AND gates 140 is opened to allow the original $\overline{ACK}$ signal 118 to be outputted as it is to the SCSI bus 104 as the $\overline{ACK}$ signal 142, as seen from FIGS. 9 and 10.

At each time in which the write signal 116 is activated, the information on the SCSI bus 104 is fetched through the bus 102 to the FIFO 100. On the other hand, at each time in which the reading signal 152 is inputted to the FIFO 100, the formation stored in the FIFO 100 is read out in the order of the fetching. In an ordinary case, the write signal 116 and the read signal 152 are in asynchronism with each other.

As explained hereinbefore, the counter 120 operates to count the original $\overline{ACK}$ signal 118, and activates the transfer completion ready signal 128 or brings it to a high level when the information transfers of the number less than the set transfer time number by one have been completed, namely, when the value of the counter 120 becomes "01$_H$". In addition, the counter 120 activates the transfer completion signal 122 or brings it to a high level when the information transfers of the set transfer time number have been completed, namely, when the value of the counter 120 becomes "00$_H$".

As the result of a progress of the information transfer operation, when the information transfers of the number less than the set transfer time number by one have been completed, the transfer completion ready signal 128 is activated. Thereafter, the REQ/ACK handshake control circuit 112 activates the original $\overline{ACK}$ signal 118 corresponding to a last transferred information, for example a last transfer byte. As a result, the output of the AND gate 126 is brought into a high level, since the transfer completion ready signal 128 has been already brought to a high level and the initiator receipt signal 130 is at a high level. Accordingly, the D-type flipflop 132 is set to generate a high level Q output. Namely, the mask signal 138 of the inverter 136 is brought into an active condition, i.e., to a low level, as shown in FIGS. 9 and 10. Thereafter, as seen from FIGS. 9 and 10, the $\overline{REQ}$ signal 114 is inactivated (namely brought to a high level), and correspondingly, the original $\overline{ACK}$ signal is also inactivated (namely brought to a high level) by the REQ/ACK handshake control circuit 112. Nevertheless, since the mask signal 138 is active (at a low level), the $\overline{ACK}$ signal 142 outputted to the SCSI bus 104 is maintained active (at a low level). Accordingly, the information transfer phase is not terminated.

On the other hand, since the counter 120 counts the original $\overline{ACK}$ signal 118, the counter 120 reaches the count number corresponding to the set transfer time number, during a period in which the $\overline{ACK}$ signal 142 is maintained in the activated condition. As a result, the transfer completion signal 122 is activated by the counter 120, as shown in FIGS. 9 and 10.

In response to the activated transfer completion signal 122, the CPU 108 checks the empty signal 106 from the FIFO 100. If the FIFO 100 is already empty, the CPU 108 immediately inactivates the initiator receipt signal 130. If the FIFO 100 is not empty, the CPU 108 inactivates the initiator receipt signal 130, namely, brings it to a low level, immediately after empty signal 106 is brought to a high level indicative of the empty of the FIFO 108, as seen from FIGS. 9 and 10.

In response to the inactivated initiator receipt signal 130, the D-type flipflop 132 is reset, so that the mask signal 138 is brought to a high level, i.e., into an inactive condition. Therefore, as shown in FIGS. 9 and 10, the $\overline{ACK}$ signal 142 is also inactivated, so that the information transfer phase is now completed.

In this fifth embodiment, and in the phase of transferring information from a target to the initiator, the phase of the target will not be changed until the FIFO of the initiator becomes empty. Therefore, the problem of the prior art can be overcome.

Figure 8:
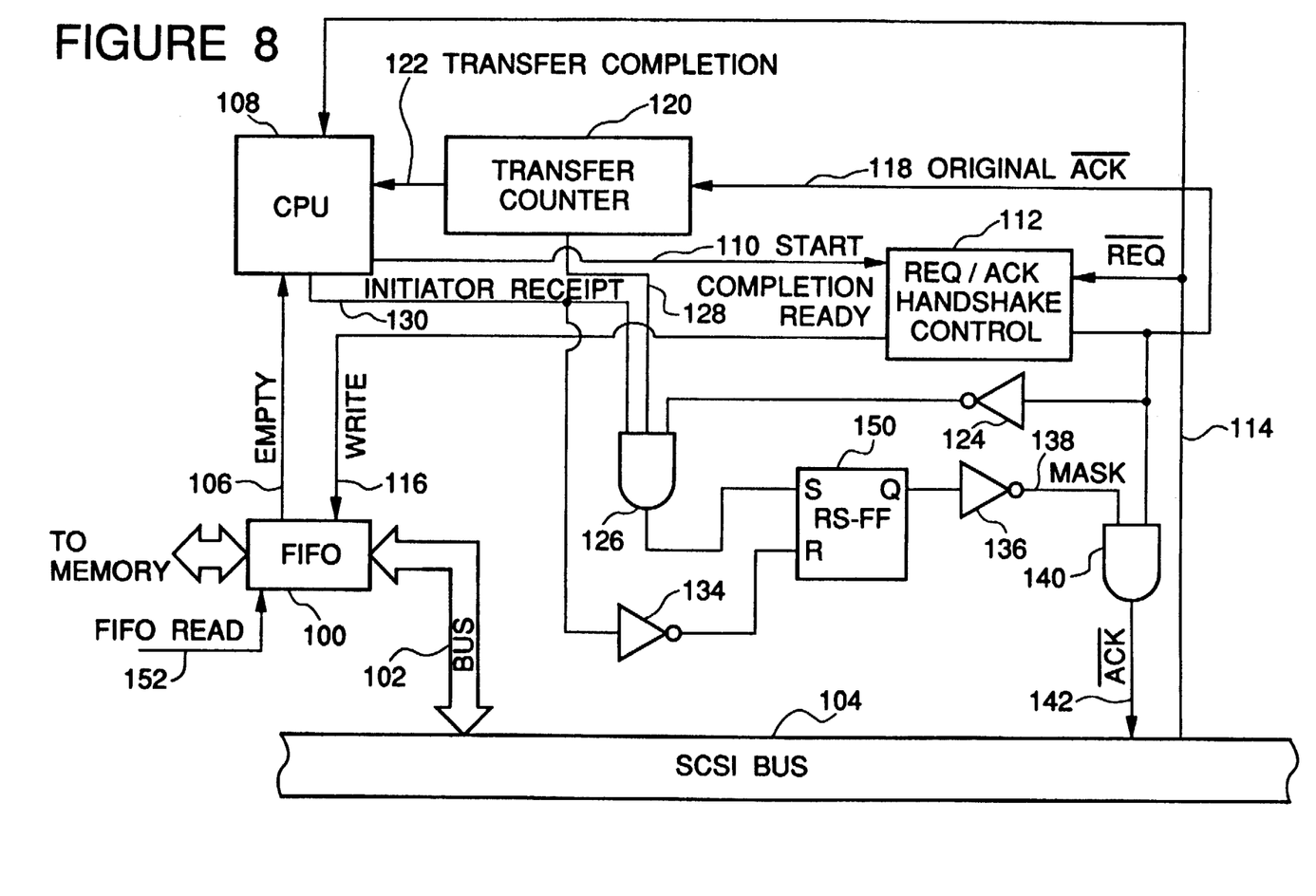
FIG. 8 is a diagram similar to FIG. 3 but showing a sixth embodiment of the SCSI bus control system in accordance with the present invention.

Referring to FIG. 8, there is shown a block diagram of a sixth embodiment of the SCSI bus control system in accordance with the present invention. In FIG. 8, elements similar to those shown in FIG. 7 are given the same Reference Numerals, and explanation thereof will be omitted.

As seen from comparison between FIGS. 7 and 8, the sixth embodiment shown in FIG. 8 includes a RS flipflop (reset-set flipflop) 150 in place of the D-type flipflop 132 of the fifth embodiment shown in FIG. 7. The RS flipflop 150 has a set input "S" connected to the output of the AND gate 126 and a reset input "R" connected to the output of the inverter 134. Namely, the sixth embodiment is modified similarly to the modification shown in FIG. 6. Therefore, an operation of the sixth embodiment shown in FIG. 8 will be apparent by combining the description of the operation of the fifth embodiment shown in FIG. 7 and the description of the operation of the fourth embodiment shown in FIG. 6.

I claim:

1. A bus control system including a handshake control circuit connected to receive an information transfer request signal from a data bus and to generate an information receipt acknowledge signal, the handshake control circuit operating to control a handshake between the information transfer request signal and the information receipt acknowledge signal, a first in-first out type memory coupled to the data bus and controlled by the handshake control circuit so as to receive information from the data bus and to output information to the data bus, the memory outputting an empty signal when the memory is empty, the empty signal being supplied to the handshake control circuit, a counter configured to be preset with an information transfer number and coupled to receive the information receipt acknowledge signal generated by the handshake control circuit so as to count the number of the information transfers executed and to generate a transfer completion ready signal when the information transfers of the number less than the preset number of the information transfers by one have been executed, and an information receipt acknowledge hold control circuit coupled to receive the transfer completion ready signal, the information receipt acknowledge hold control circuit operating to control the handshake control circuit, after the transfer completion ready signal is activated, so as to cause the handshake control circuit to hold the information receipt acknowledge signal in an active condition after the information receipt acknowledge signal in correspondence to a last information transfer is activated and until the empty signal is activated to indicate the emptiness of the memory.

2. A bus control system including a handshake control circuit connected to receive an information transfer request signal from a data bus and to generate an original information receipt acknowledge signal, the handshake control circuit operating to control a handshake between the information transfer request signal and the information receipt acknowledge signal, a first in-first out type memory coupled to the data bus and controlled by the handshake control circuit so as to receive information from the data bus and to output information to the data bus, the memory outputting an empty signal when the memory is empty, a counter configured to be preset with an information transfer number and coupled to receive the original information receipt acknowledge signal generated by the handshake control circuit so as to count the number of the information transfers executed and to generate a transfer completion ready signal when the information transfers of the number less than the preset number of the information transfers by one have been executed, and an information receipt acknowledge hold control circuit coupled to receive the transfer completion ready signal and the empty signal, and also coupled to receive the original information receipt acknowledge signal from the handshake control circuit to output an information receipt acknowledge signal to the data bus, the information receipt acknowledge hold control circuit operating to output the original information receipt acknowledge signal to the data bus as the information receipt acknowledge signal before the transfer completion ready signal is activated, the information receipt acknowledge hold control circuit also operating, after the transfer completion ready signal is activated, to maintain the information receipt acknowledge signal in an active condition after the original information receipt acknowledge signal in correspondence to a last information transfer is activated and until the empty signal is activated to indicate the emptiness of the memory.

3. A bus control system including a handshake control circuit connected to receive an information transfer request signal from a data bus and to generate an original information receipt acknowledge signal, the handshake control circuit operating to control a handshake between the information transfer request signal and the original information receipt acknowledge signal, a first in-first out type memory coupled to a data bus and controlled by the handshake control circuit so as at least to receive information from the data bus, the memory outputting an empty signal when the memory is empty, a counter configured to be preset with an information transfer number and coupled to receive the original information receipt acknowledge signal generated by the handshake control circuit so as to count the number of the information transfers executed, the counter operating to generate a transfer completion ready signal when the information transfers of the number less than the preset number of the information transfers by a predetermined number have been executed, and a transfer completion signal when the information transfers of the preset number have been executed, a processor connected to receive the empty signal and the transfer completion signal and operating to generate an operation start signal to the handshake control signal, the processor also operating to generate an activated initiator receipt mode signal when the system should operate to receive information as an initiator and to inactivate the initiator receipt mode signal when the transfer completion signal is activated and the empty signal is activated, and an information receipt acknowledge hold control circuit coupled to receive the transfer completion ready signal and the initiator receipt mode signal, and also coupled to receive the original information receipt acknowledge signal from the handshake control circuit to output an information receipt acknowledge signal to the data bus, the information receipt acknowledge hold control circuit to output the original information receipt acknowledge signal to the data bus as the information receipt acknowledge signal before the transfer completion ready signal is activated, the information receipt acknowledge hold control circuit also operating, after the transfer completion ready signal is activated, to maintain the information receipt acknowledge signal in an active condition after the original information receipt acknowledge signal in correspondence to a last information transfer is activated and until the initiator receipt mode signal is inactivated.

4. A system claimed in claim 3 wherein the processor is connected to receive the information transfer request signal so as to generate the operation start signal and the initiator receipt mode signal.

5. A system claimed in claim 3 wherein the handshake control circuit outputs a write signal to the memory at each time in which the information transfer request signal is activated.

6. A system claimed in claim 3 wherein the predetermind number is one.

7. A system claimed in claim 3 wherein the information receipt acknowledge hold control circuit includes a first AND gate coupled to receive the transfer completion ready signal, the initiator receipt mode signal and the original information receipt acknowledge signal, a flipflop connected to receive an output of the first AND gate and the initiator receipt mode signal and brought to a first condition when the output of the first AND gate is activated and to a second condition when the initiator receipt mode signal is inactivated, and a second AND gate connected to receive the original information receipt acknowledge signal and an output of the flipflop so as to generate the information receipt acknowledge signal to the data bus.

8. A system claimed in claim 7 wherein the flipflop is of a D-type having a data input connected to a fixed potential, a clock input connected to the output of the first AND gate, and a reset input connected to receive the initiator receipt mode signal through an inverter.

9. A system claimed in claim 7 wherein the flipflop is a of reset/settype having a set input connected to the output of the first AND gate, and a reset input connected to receive the initiator receipt mode signal through an inverter.

* * * * *